(12) United States Patent
Rivnay et al.

(10) Patent No.: US 12,534,702 B2
(45) Date of Patent: Jan. 27, 2026

(54) ELECTROACTIVE BIOCOMPATIBLE HYDROGEL STRUCTURES

(71) Applicant: Northwestern University, Evanston, IL (US)

(72) Inventors: Jonathan Rivnay, Chicago, IL (US); Anthony J. Petty, Evanston, IL (US); Cheng Sun, Wilmette, IL (US); Henry Oliver T. Ware, Evanston, IL (US)

(73) Assignee: Northwestern University, Evanston, IL (US)

( * ) Notice: Subject to any disclaimer, the term of this patent is extended or adjusted under 35 U.S.C. 154(b) by 501 days.

(21) Appl. No.: 17/230,195

(22) Filed: Apr. 14, 2021

(65) Prior Publication Data

US 2021/0322648 A1   Oct. 21, 2021

Related U.S. Application Data

(60) Provisional application No. 63/010,181, filed on Apr. 15, 2020, provisional application No. 63/010,156, filed on Apr. 15, 2020.

(51) Int. Cl.
| | |
|---|---|
| *A61L 27/44* | (2006.01) |
| *A61L 27/36* | (2006.01) |
| *A61L 27/52* | (2006.01) |
| *A61L 27/56* | (2006.01) |
| *C08F 20/20* | (2006.01) |
| *C08G 61/12* | (2006.01) |
| *C12N 5/00* | (2006.01) |

(52) U.S. Cl.
CPC ........ *C12N 5/0068* (2013.01); *A61L 27/3695* (2013.01); *A61L 27/44* (2013.01); *A61L 27/52* (2013.01); *A61L 27/56* (2013.01); *C08F 20/20* (2013.01); *C08G 61/126* (2013.01); *C08G 2261/12* (2013.01); *C08G 2261/1452* (2013.01); *C08G 2261/149* (2013.01); *C08G 2261/18* (2013.01); *C08G 2261/3247* (2013.01); *C08G 2261/50* (2013.01); *C12N 2533/54* (2013.01); *C12N 2537/00* (2013.01)

(58) Field of Classification Search
CPC . C08F 20/20; C12N 2533/54; C12N 2537/00; C12N 5/0068; C08G 2261/11; C08G 2261/12; C08G 2261/1424; C08G 2261/1426; C08G 2261/143; C08G 2261/1432; C08G 2261/145; C08G 2261/1452; C08G 2261/149; C08G 2261/18; C08G 2261/3223; C08G 2261/3247; C08G 2261/50; C08G 2261/64; C08G 2261/77; C08G 2261/792; C08G 2261/94; C08G 61/126
See application file for complete search history.

(56) References Cited

U.S. PATENT DOCUMENTS

| | | | | |
|---|---|---|---|---|
| 5,498,407 | A | * | 3/1996 | Atlas ...................... A61K 8/042 424/707 |
| 6,030,550 | A | * | 2/2000 | Angelopoulos ........ H01B 1/127 528/417 |
| 9,808,616 | B2 | | 11/2017 | Coderna et al. |
| 10,109,386 | B2 | | 10/2018 | Mallires et al. |
| 10,179,953 | B2 | | 1/2019 | Majd et al. |
| 10,858,522 | B2 | | 12/2020 | Feig et al. |
| 2007/0054340 | A1 | * | 3/2007 | Law ................... G01N 33/9446 435/7.92 |
| 2017/0342213 | A1 | | 11/2017 | Green et al. |
| 2021/0324327 | A1 | | 10/2021 | Rivnay et al. |

FOREIGN PATENT DOCUMENTS

| | | | |
|---|---|---|---|
| WO | WO-2008130326 A1 * | 10/2008 | .......... C08G 61/126 |
| WO | WO 2009/054814 A1 | 4/2009 | |
| WO | 2013036708 A2 | 3/2013 | |
| WO | WO 2015/054484 A1 | 4/2015 | |
| WO | WO 2017/011450 A1 | 1/2017 | |
| WO | WO 2016/077551 A1 | 5/2019 | |
| WO | WO 2019/199899 A1 | 10/2019 | |

OTHER PUBLICATIONS

Mawad, Damia, et al., Chem. Mater. 2016, 28, 6080-6088 (Year: 2016).*
Spectrum, Glutaric Anhydride, acessed Nov. 16, 23, pp. 1-4 (Year: 2023).*
Yibo Wu et al., "Fabrication of conductive gelatin methacrylate-polyaniline hydrogels," *Acta Biomaterialia*, (2016), vol. 33; pp. 122-130.
Dong Nyoung Heo et. al., "Development of 3D printable conductive hydrogel with crystallized PEDOT: PSS for neural tissue engineering," *Materials Science & Engineering C*, (2019), vol. 99; pp. 582-590.
Adam E. Jakus et al., "Three-Dimensional Printing of High-Content Graphene Scaffolds for Electronic and Biomedical Applications," *ACS Nano*, 2015, vol. 9, No. 4; pp. 4636-4648.
Thomas Distler et al., "3D printing of electrically conductive hydrogels for tissue engineering and biosensors—a review," *Acta Biomaterialia*, (2020), vol. 101; pp. 1-13.
Roger H. Karlsson et al., "Iron-Catalyzed Polymerization of Alkoxysulfonate-Functionalized 3,4-Ethylenedioxythiophene Gives Water-Soluble Poly(3,4-ethylenedioxythiophene) of High Conductivity," *Chem. Mater.*, 2009, vol. 21; pp. 1815-1821.

(Continued)

*Primary Examiner* — Brian-Yong S Kwon
*Assistant Examiner* — Lyndsey M Beckhardt
(74) *Attorney, Agent, or Firm* — Bell & Manning, LLC

(57) ABSTRACT

Biocompatible polymer hydrogel composite structures, methods of making the composite structures, and methods of using the composite structures as scaffolds for biological tissue growth and regeneration are provided. The methods for making the composite structures start with a porous high resolution three-dimensional hydrogel scaffold in which polymer precursors are infused and then polymerized in situ to form a water-soluble, electrically conducting polymer that is bonded to and/or entrapped within the hydrogel.

6 Claims, 8 Drawing Sheets

(56) References Cited

OTHER PUBLICATIONS

Robert S. Jordan et al., "3D Printing of Conjugated Polymers," *Journal of Polymer Science*, 2019, vol. 57; pp. 1592-1605.

Antonio Jesus Guerra et al., "Three-Dimensional Tubular Printing of Bioabsorbable Stents: The Effects Process Parameters Have on In Vitro Degradation," *3D Printing and Additive Manufacturing*, 2019, vol. 6, No. 1, pp. 50-56.

Hui Wu et al., "Stable Li-ion battery anodes by in-situ polymerization of conducting hydrogel to conformally coat silicon nanoparticles," *Nature Communications*, pp. 1-6.

Hai, Wenteng, et al. "Specific recognition of human influenza virus with PEDOT bearing sialic acid-terminated trisaccharides." *ACS applied materials & interfaces*, (2017), vol. 9, No. 16; pp. 14162-14170.

Ware, Henry Oliver T., et al. "PLLA-infused citric acid-based bioresorbable vascular scaffolds 3D printed via microCLIP (Conference Presentation)." Emerging Digital Micromirror Device Based Systems and Applications XI. vol. 10932. International Society for Optics and Photonics, 2019.

Zhijun Shi et al., "Electroconductive natural polymer-based hydrogels," *Biomaterials*, (2016), vol. 111; pp. 40-54.

M. M. Patil et al., "Succinimides: Synthesis, Reaction and Biological Activity," *International Journal of Pharmacy and Pharmaceutical Sciences*, vol. 6, Issue 11, 2014; pp. 1-7.

Samadhan Nagane et al., "Functionalized Polythiophene Copolymers for Electronic Biomedical Devices," *MRS Advances*, 2020; pp. 1-14.

Taniya M. S. K. Pathiranage et al., "Role of Polythiophenes as Electroactive Materials," *Journal of Polymer Science Review*, pp. 1-20.

Bhat, Mushtaq A., Reyaz A. Rather, and Aabid H. Shalla. "PEDOT and PEDOT: PSS conducting polymeric hydrogels: a report on their emerging applications." *Synthetic Metals* 273 (2021): 116709.

Richard Balint et al., "Review—Conductive polymers: Towards a smart biomaterial for tissue engineering," *Acta Biomaterialia*, 2014; pp. 1-13.

Baolin Guo et al., "Conducting Polymers for Tissue Engineering," Biomacromolecules, Jun. 11, 2028; 19(6):1764-1782. doi:101021/acs.biomac.8b00276.

* cited by examiner

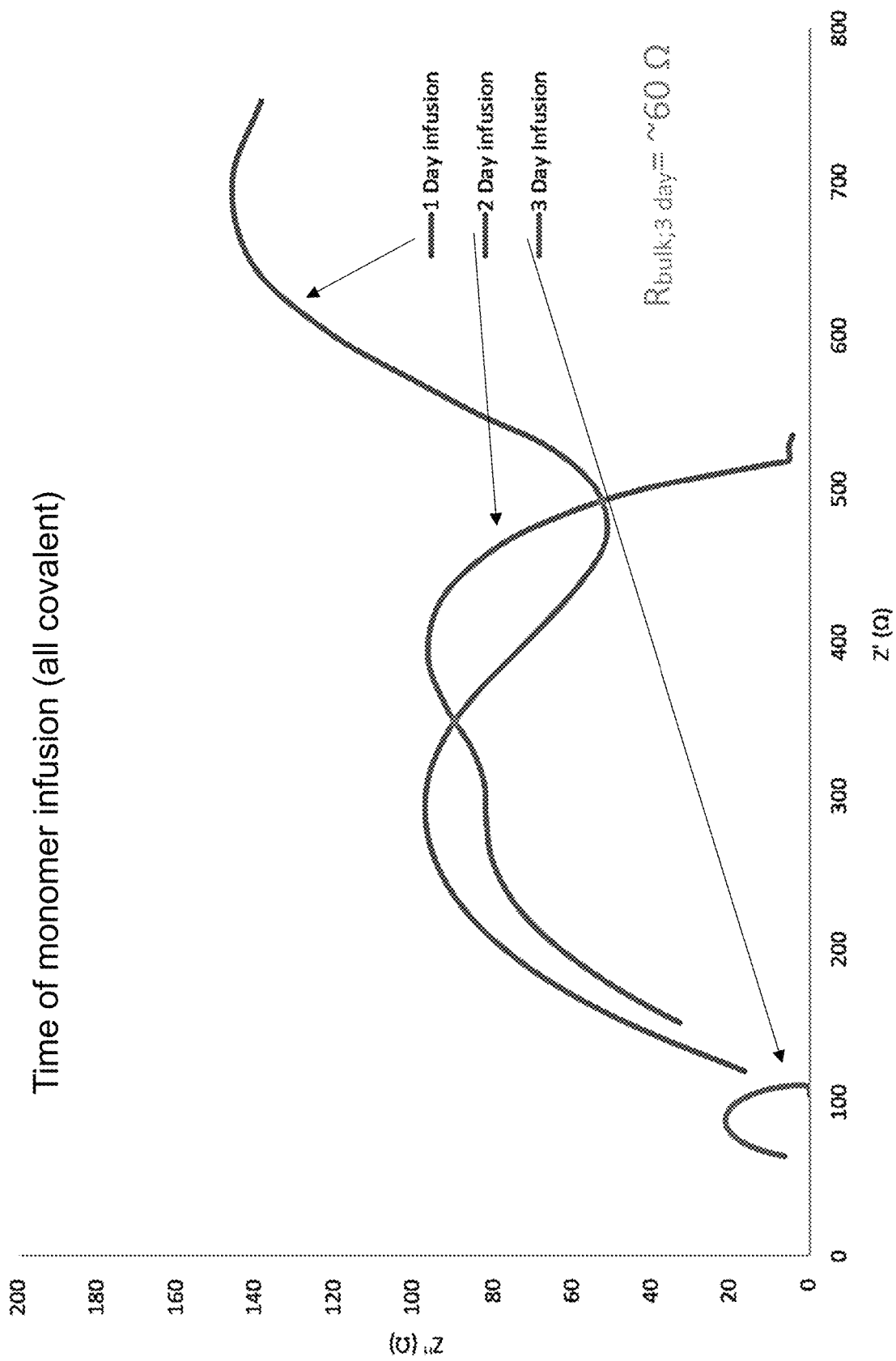

ELECTROACTIVE BIOCOMPATIBLE HYDROGEL STRUCTURES

CROSS-REFERENCE TO RELATED APPLICATIONS

The present application claims priority to U.S. provisional patent application No. 63/010,156 that was filed Apr. 15, 2020, and U.S. provisional patent application No. 63/010,181 that was filed Apr. 15, 2020, the entire contents of which are incorporated herein by reference.

REFERENCE TO GOVERNMENT RIGHTS

This invention was made with government support under grant number HL141933 awarded by the National Institutes of Health. The government has certain rights in the invention.

BACKGROUND

Incorporating electroactive components, such as conducting polymers, graphene, and carbon nanotubes, in biomaterials has a significant effect on cellular adhesion, proliferation, and differentiation, as well as allowing for both the possibility of electrical stimulation and sensing to both augment and better understand the environment of regenerating tissue. However, achieving sufficient electroactivity for stimulation and sensing along with a high enough resolution to affect the cellular environment in three dimensions is an on-going challenge.

Incorporation of electroactive elements into photopolymerizable biomaterials is particularly challenging because the conducting elements absorb the light that is used to initiate polymerization, thereby interfering with the cross-linking process and making it difficult to achieve three-dimensional (3D) structures with high resolution and shape fidelity. Most attempts to do this have led to some combination of extremely stiff materials (on the order of MPa), low resolution structures, and structures with limited electrical conductivity. The stiffness is problematic for biomaterial applications, the low resolution limits the type of deterministic architectures that can be used, and the limited electrical conductivity reduces the number of applications for which the structures are suitable.

SUMMARY

Polymer hydrogel composite structures, methods of making the composite structures, and methods of using the composite structures to grow biological tissues are provided.

One example of a polymer hydrogel composite structure includes: a porous, three-dimensional scaffold comprising one or more features, the one or more features having a dimension of 100 µm or smaller; and a water-soluble, electrically conducting, biocompatible polymer infiltrating the porous, three-dimensional scaffold, wherein the water-soluble, electrically conducting, biocompatible polymer is covalently bonded to the hydrogel by an organic linker.

An example of a method of making such a polymer hydrogel composite structure includes the steps of: forming a porous three-dimensional scaffold comprising a hydrogel and having a minimum feature size of 100 µm or smaller; functionalizing surfaces of the porous three-dimensional scaffold with pendant polymerizable groups; infusing the scaffold with a water-soluble, electrically conducting, biocompatible polymer precursor; and polymerizing the polymer precursor to form a water-soluble, electrically conducting, biocompatible polymer that infiltrates the porous, three-dimensional scaffold, wherein the pendant polymerizable groups are polymerized into the backbone of the water-soluble, electrically conducting, biocompatible polymer during the polymerization of the polymer precursors.

One example of a polymer hydrogel composite structure includes: a porous, three-dimensional scaffold comprising a hydrogel and having one or more features with a dimension of 100 µm or smaller; and a water-soluble, electrically conducting, biocompatible, sulfate-functionalized polythiophene polymer entrapped within the hydrogel.

An example of a method of making such a polymer hydrogel composite structure includes the steps of: forming a porous, three-dimensional scaffold comprising a hydrogel and having one or more features with a dimension of 100 µm or smaller; infusing the scaffold with a water-soluble, electrically conducting, biocompatible sulfate-functionalized polythiophene polymer precursor; and polymerizing the water-soluble, electrically conducting, biocompatible, sulfate-functionalized polythiophene polymer precursor to form a water-soluble, electrically conducting, biocompatible, sulfate-functionalized polythiophene polymer entrapped within the hydrogel.

Examples of methods of growing biological tissue using the polymer hydrogel composite structures described herein include the steps of: seeding the polymer hydrogel composite structure with biological cells; and culturing the seeded polymer hydrogel composite structure in a cell culture medium.

BRIEF DESCRIPTION OF THE DRAWINGS

Illustrative embodiments of the invention will hereafter be described with reference to the accompanying drawings, wherein like numerals denote like elements.

FIG. 5B is a graph of the impedance of scaffolds with covalently bound poly(ethylenedioxythiophene) as a function of the precursor infusion period, showing that a longer infusion time may lower impedance.

DETAILED DESCRIPTION

Biocompatible polymer hydrogel composite structures, methods of making the structures, and methods of using the structures as scaffolds for biological tissue growth and regeneration are provided.

The methods of making the structures begin with a porous three-dimensional (3D) hydrogel scaffold. The scaffolds my be constructed to provide pores that are separated by thin, well-defined pore walls having substantially uniform thicknesses. Once formed, the hydrogel scaffolds are infiltrated with a water-soluble, electrically conducting polymer, which may be entrapped within the hydrogel that makes up the scaffold, covalently bonded to the hydrogel scaffold via organic linkers, or both. The electrically conducting polymer bestows the scaffolds with tunable electroactivity without sacrificing resolution or cytocompatibility by exploiting the water swellabillity of the 3D scaffold.

As used herein, the term biocompatible refers to a material that does not have a significant negative impact on tissue growth and viability and/or a material that, if implanted in a living biological entity (e.g., a mammal, such as a human), does not cause an adverse reaction in that biological entity. As used herein, the term cytocompatible refers to a material that is biocompatible and, more specifically, that does not have an adverse effect on the growth and viability of biological cells.

The 3D scaffolds can be made using a variety of techniques that allow for desired geometric designs, porosities, and feature dimensions, including feature dimensions of 100 µm or smaller, or even 10 µm or smaller. Scaffold features that can have such small dimensions include, for example, pore walls, which can have thicknesses of 100 µm or smaller, fibers, which can have diameters of 100 µm or smaller, and/or pores, which can have pore diamters of 100 µm or smaller. Suitable techniques for fabricating the 3D scaffolds include printing and molding. 3D extrusion-type printing is well suited for scaffold construction because it allows for the controlled fabrication of porous scaffolds from one or more printed fibers having adjustable, substantially uniform, and biologically relevant fiber diameters. In the 3D printed scaffolds, the pore walls are provided by one or more intersecting (i.e., overlapping, contacting, and/or interconnected) printed fibers.

Figure 1:
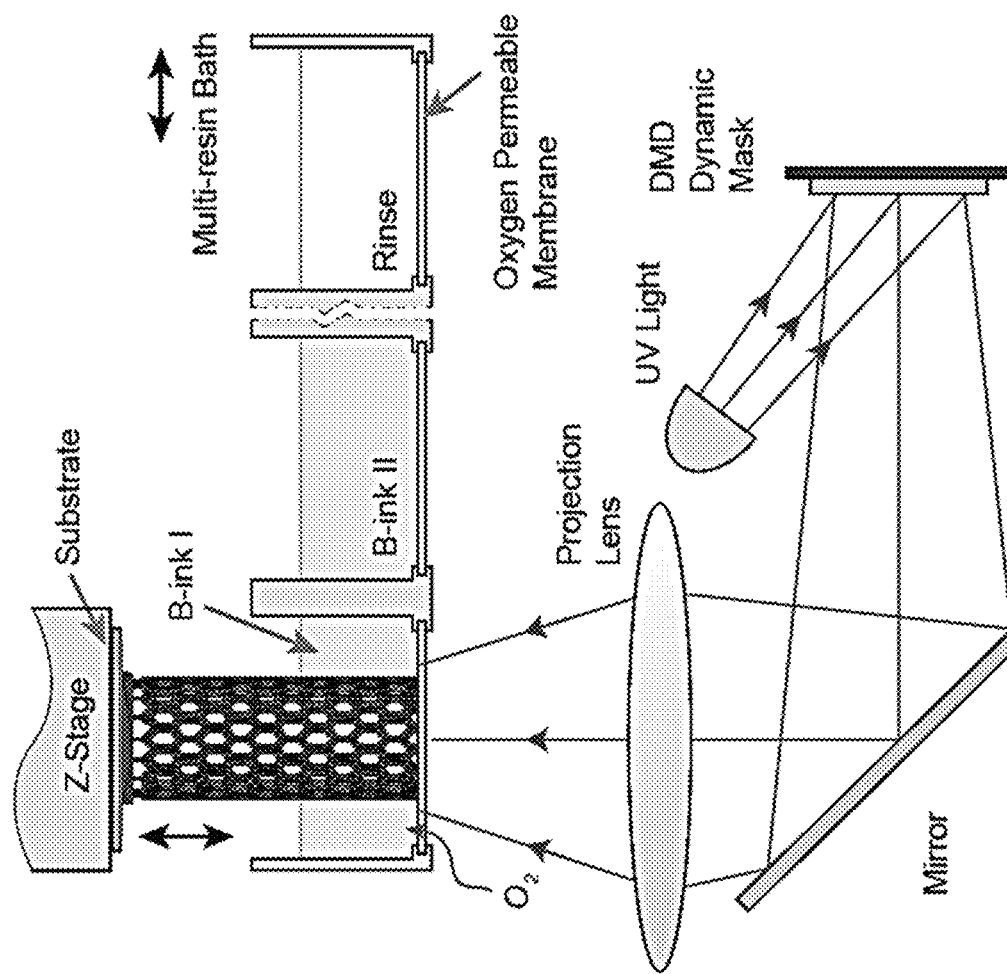
FIG. 1 is a schematic diagram of one embodiment of a micro continuous liquid interface production (microCLIP) printing system.

MicroCLIP printing is an example of a 3D printing process that can be used. MicroCLIP printing is a continuous process that can create smooth-sided solid objects via the photopolymerization of resins. An illustrative embodiment of a MicroCLIP printer is shown in FIG. 1. The process uses a reservoir of liquid photopolymer resin (B-ink I) that is held in a container having a floor, typically a membrane (a "window"), through which radiation (e.g., ultraviolet light) and oxygen can pass. A radiation source, such as an ultraviolet light, directs a beam of radiation through the window, illuminating the cross-section of the object to be formed and curing and solidifying the resin in the illuminated area. The radiation can be focused and directed onto the window using an optical system that includes such components as dynamic masks, mirrors, and/or lenses. Using a z-stage, the object (e.g., scaffold) can be raised continuously to allow the resin to flow under the object, thereby allowing for continued object growth. Because the floor is oxygen-permeable, it enables the creation of a "dead zone" (persistent liquid interface) that prevents the resin from attaching to the window. If the object is made of more than one type of resin, it can be moved to additional resin reservoirs (e.g., B-ink II) during the 3D printing process. A reservoir of a rinse solution can be used to rinse the object before it is transferred from one resin reservoir to another.

MicroCLIP 3D printing allows for the formation of fibers with very smooth surfaces and diameters of 100 µm or smaller, including diamters of 10 µm or smaller. Because microCLIP printing uses radiation to polymerize the scaffold, the present methods, which use post-printing functionalization with a conductive polymer, do not interfere with the printing process.

The scaffolds are biocompatible, water-swellable, hydrogel constructs made from biocompatible monomers, oligomers, and/or resins and, optionally, multifunctional crosslinking agents and/or other additives. Scaffolds to be used for cell culture and/or tissue growth applications are also cytocompatible. Examples of suitable monomers include acrylates and methacrylates (collectively referred to as "(meth) acrylates"), such as hydroxyethylmethacrylate (HEMA). Examples of suitable crosslinking agents include multifunctional acrylates having two or more acrylate functionalities, such as poly(ethyleneglycol)di(meth)acrylates (PEGDA) resin. If the electrically conducting polymer is to be covalently grafted to the hydrogel scaffold, as discussed in more detail below, the monomers, oligomers, and/or resins should include reactive functional groups capable of reacting with the electrically conducting polymer precursors or with other organic linking molecules that are capable of reacting with the electrically conducting polymer precursor. By way of illustration, the use of monomers with free hydroxyl (—OH) groups, such as HEMA, can impart suitable reactivity to the hydrogel scaffold.

Other combinations of components that can polymerize/crosslink to form the scaffolds include polyethylene glycol (PEG) and triethylene glycol dimethacrylate (TEGDMA); methacrylic acid and TEGDMA; PEG-poly(ethyleneglycol) methacrylate (PEGMA) and TEGDMA; carboxymethyl cellulose and TEGDMA; and polyvinylpyrrolidone and TEGDMA. All of these listed combinations can form hydrogels via free radical polymerization.

Figure 2:
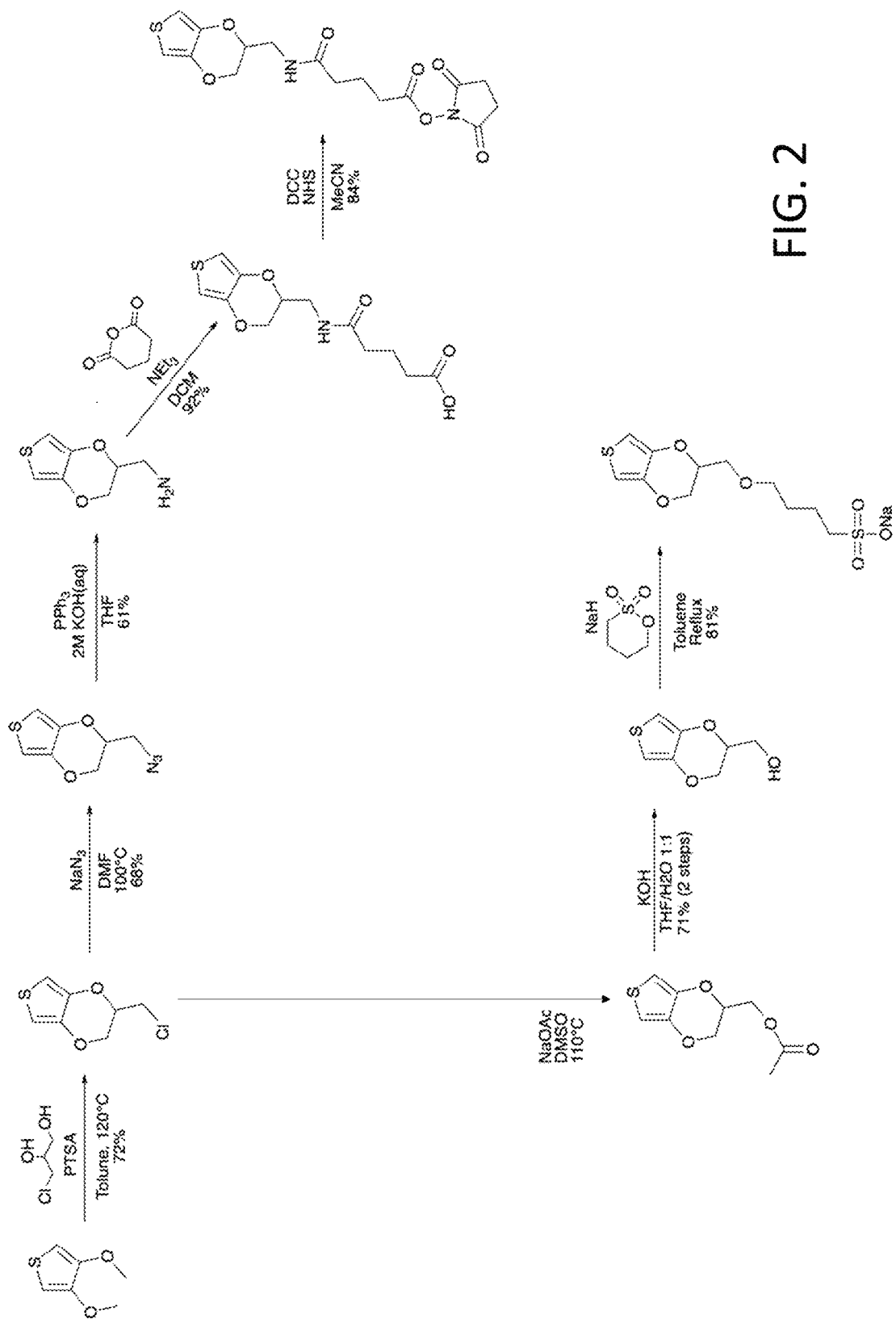
FIG. 2 shows reaction schemes for the synthesis of an organic linking molecule (top) and a cytocompatible polymer precursor monomer (bottom).

Once the scaffolds are constructed, they are infused with a solution of water-soluble, electrically conducting, cytocompatible polymer precursors. These precursors are organic monomers, oligomers, and/or polymers that polymerize and/or crosslink to form water-soluble, electrically conducting, cytocompatible polymers, such as water-soluble, electrically conducting, cytocompatible conjugated polymers. Electrically conducting polythiophenes can be used. Polyethylenedioxythiophene (PEDOT) homopolymers and copolymers are illustrative examples of polythiophenes. In some embodiments of the methods, the precursors are ethylenedioxythiophene monomers that are desirably functionalized with water-soluble groups, such as sulfate groups. The water-soluble groups served to enhance the water-solubility of the polymers, relative to their water-solubility in the absence of said groups. A scheme for the synthesis of sulfate-functionalized ethylenedioxythiophene (EDOT) monomers is shown in FIG. 2. Because the polymerization of the precursors takes place in situ, after the precursors are infused through the porous scaffolds, the electrically conducting cytocompatible polymers infiltrate the hydrogel of the scaffolds, rather than merely coating the exterior surface of the scaffold. The in situ polymerization may be conducted using, for example, a chemical oxidative polymerization of the precursors in the presence of an oxidizer, such as phytic acid and/or ammonium persulfate.

Notably, the in situ polymerization of the electrically conducting polymer does not appreciably affect the resolution (e.g., feature dimensions) of the overall structure.

Prior to the in situ polymerization of the polymer precursors, the hydrogel scaffold can be functionalized with pendant groups that are themselves polymerizable with the polymer precursors. This can be accomplished by reacting reactive functionalities on the hydrogel with organic linker molecules. The organic linker molecules have a first functional group that reacts with the hydrogel to form an organic linker that is covalently bonded to the hydrogel, and a second functional group that polymerizes into the electrically conducting polymers as it is formed in situ. The first and second functional groups may be separated by a linker chain (also referred to as a "handle"). The linker chain may be a substituted or unsubstituted alkyl chain, a substituted or unsubstituted alkenyl chain, or a substituted or unsubstituted alkynyl chain. By way of illustration, substituted or unsubstituted $C_1$-$C_6$ alkyl, alkenyl, or alkynyl chains may be used as the linker chain. Substituted or unsubstituted heteroalkyl, heteroalkenyl, or heteroalkynyl chains can also be used as linker chains, where heteroalkyl, heteroalkenyl, or heteroalkynyl chains refer to alkyl, alkenyl, and alkynyl chains (including $C_1$-$C_6$ alkyl, alkenyl, or alkynyl chains), respectively, in which the carbon chain is interrupted by one or more heteroatoms, such as nitrogen, oxygen, and/or sulfur atoms. Alkoxy chains are illustrative examples of heteroalkyl chains.

Figure 3:
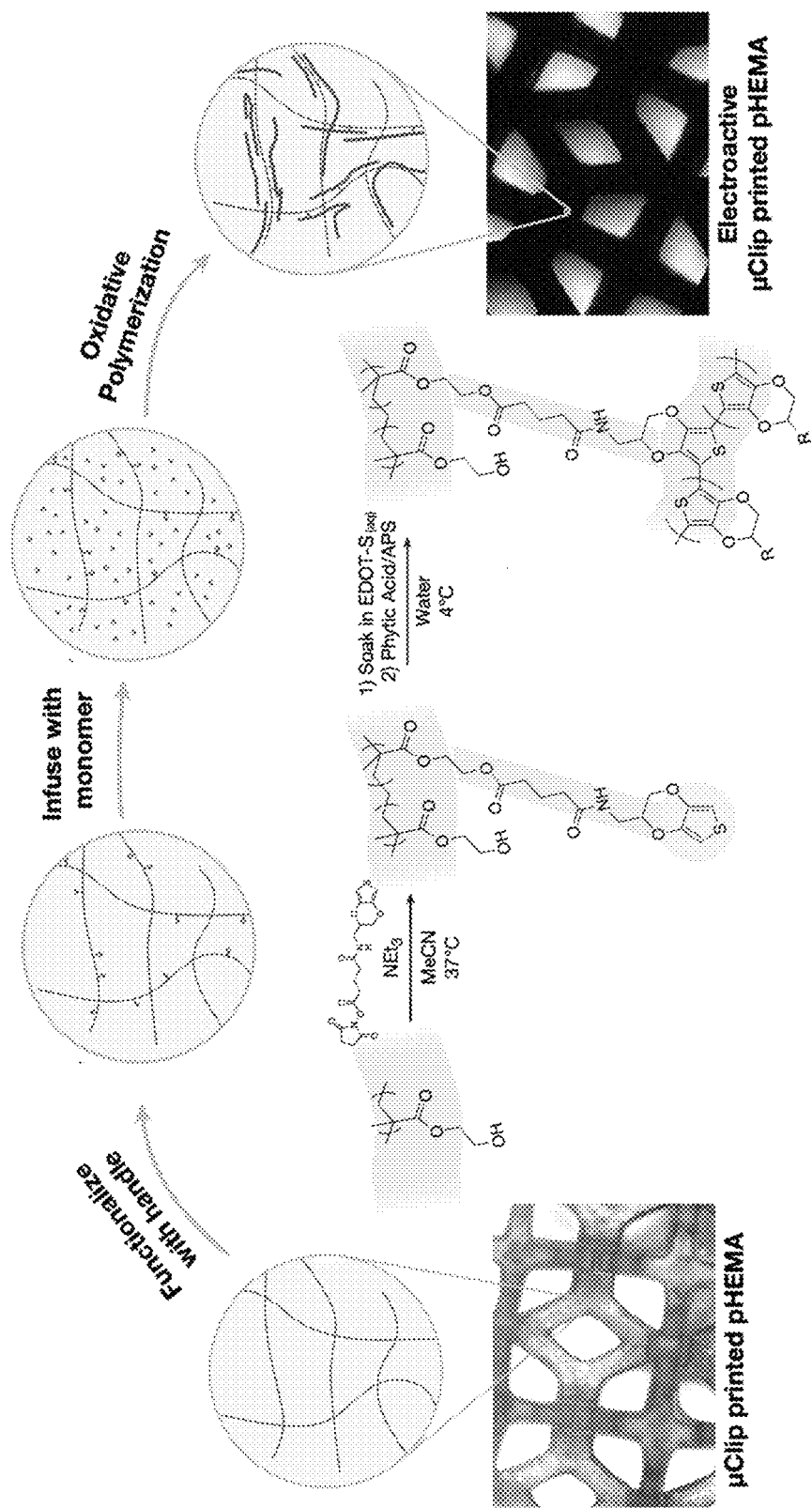
FIG. 3 is a schematic illustration of a method for functionalizing a hydrogel scaffold with a conjugated, electrically conducting polymer, including the reaction scheme, and images of a hydrogel scaffold before and after it is functionalized with the conjugated polymer.

By way of illustration, an organic linker molecule comprising an ethylenedioxythiophene group and a free succinimide groups can be used. The succinimide groups are able to react with a hydroxy-functional hydrogel to provide covalent bonding, while the thiophene groups are able to polymerize into a poly(ethylenedioxythiophene), which is electrically conductive. A scheme for the synthesis of one such organic linker molecule is shown in FIG. 2. The formation of a conducting polymer hydrogel composite in which a poly(ethylenedioxythiophene) is covalently grafted to a HEMA-based hydrogel scaffold via the linker molecules of FIG. 2 is illustrated in FIG. 3. Covalent grafting of the electrically conducting polymer is not required. In the absence of covalent bonding, the electrically conductive polymer will be entrapped within the porous hydrogel.

The conducting polymer hydrogel composites have electroactivity, which facilitates in vitro cell proliferation and differentiation and enables bulk electrical stimulation to enhance tissue growth and regeneration. The tissue growth or regeneration may be passive—that is, without the application of an external electrical bias, or active—that is, carried out under the influence of an applied electrical bias. Electrical recording devices and/or electrical stimulation devices can be integrated directly into the biological sample to monitor and/or promote tissue growth.

The porous composites can be used as biological cell and tissue growth scaffolds by seeding the scaffolds with biological cells, such as human mesenchymal cells (hMSCs), and culturing the seeded scaffolds in a cell culture medium, including a differentiation medium or a proliferation medium. Alternatively, the porous composites can be implanted into an animal (e.g., a human) subject for in vivo cell growth, differentiation, and proliferation. Tissues that can be grown using the tissue growth scaffolds include dermal, neural, osteo, chondral, osteochondral, and cardiac tissue. Optionally, cell adhesion promoters and/or biological factors can be incorporated into the scaffolds to promote tissue growth.

EXAMPLE

This example illustrates a method of forming a biocompatible, electrically conducting sulfate-functionalized PEDOT polymer in microCLIP-printed hydrogel scaffolds using methylamino-ethylenedioxythiophene monomers as a polymer precursor. This example further illustrates methods of covalently bonding ("grafting") the sulfate-functionalized PEDOT polymer to a hydrogel scaffold by introducing pendant succinimide groups into the hydrogel using a succinimide group-containing linker molecule. Synthesis schemes for the linking molecule and for the polymer precursor are shown in FIG. 2. Finally, methods of using hydrogel scaffolds with the PEDOT polymers covalently bonded to the hydrogel or entrapped within the hydrogel are demonstrated.

Synthesis of Organic Linker Molecule and Polymer Precursor (FIG. 2):

Unless otherwise noted, all reagents were acquired from Sigma Aldrich and were used as received. Ethylenedioxythiophene-butane sulfonic acid (EDOT-S; polymer precursor) and methylamino-ethylenedioxythiophene (EDOT-A) were prepared according to literature procedures. (See, Karlsson, Roger H., et al. *Chemistry of Materials* 21.9 (2009): 1815-1821 and Hai, Wenfeng, et al. *ACS applied materials & interfaces* 9.16 (2017): 14162-14170)

Synthesis of Carboxylic Acid Precursor:

EDOT-A (2 g, 0.0116 mol) and glutaric anhydride (1.6 g, 0.014 mol) were dissolved in dichloromethane (60 mL) and cooled in an ice water bath. After cooling, triethylamine (1.96 mL, 0.014 mol) was added dropwise, forming a milky white precipitate. The reaction was monitored by TLC, and upon completion was poured into a 10% sodium carbonate solution and extracted 3× with diethyl ether. The pH was made acidic with 10% sulfuric acid, and the product was extracted using diethyl ether. The organic phase was dried with magnesium sulfate, filtered, and the solvent was removed via evaporation, and the resulting viscous oil was used in the next step without further purification (3.0 g, 92%).

Synthesis of EDOT-NHS (Linker Molecule):

EDOT-COOH (3 g, 0.0106) mol) DCC (2.65 g, 0.013 mol) and n-hydroxysuccinimide (1.5 g. 0.013 mol) from the previous step were added to acetonitrile (50 mL), and the reaction was allowed to stir at room temperature overnight. The next day, a large amount of white solid was filtered off, and the solvent was removed from the filtrate. The resulting white solid was resuspended in acetonitrile (50 mL), sonicated, filtered, and the solvent was removed from the filtrate via evaporation. This process was repeated two more times until a viscous oil was left behind after removal of solvent. The oil was dissolved a final time in acetonitrile, but this time was placed in a freezer overnight to facilitate the removal of the last of the cyclohexyl urea. The next day, the solution was filtered, the solvent was removed, and the resulting oily solid was recrystallized from a mixture of acetone and hexanes (3.25 g, 84%). $^1$H-NMR (500 MHz; DMSO-$d_6$): δ 8.15 (t, J=5.7 Hz, 1H), 6.57 (t, J=1.1 Hz, 2H), 4.23-4.17 (m, 2H), 3.89 (dd, J=11.7, 7.6 Hz, 1H), 3.41-3.29 (m, 5H, overlapping with water peak), 2.82 (s, 4H), 2.69 (d, J=7.4 Hz, 2H), 2.25 (td, J=7.3, 1.6 Hz, 2H), 1.85 (m, 2H).

Covalent Functionalization of 3D-Printed Hydrogels (FIG. 3):

A porous polyhydroxyethylmethacrylate (pHEMA) cross-linked with 1 mol. % PEGDA hydrogel scaffold was microCLIP printed. For the versions of the scaffolds in which the conducting polymer was covalently bonded to hydrogel, the scaffold was functionalized using a EDOT-NHS linking molecule. An image of a portion of the porous microCLIP printed hydrogel scaffold in shown on the left side of FIG. 3.

EDOT-NHS (25 mg) was dissolved in 1 mL of acetonitrile, to which the 3D-printed hydrogel scaffold (3DHGS) was added, followed by triethylamine, which was incubated at 37° C. for 2 hours. The 3DHGS was removed, leached in acetonitrile for 1 hr, then leached in deionized (DI) water for 30 minutes. It was then placed into a 400 mg/mL solution of EDOT-S in DI water for the required amount of time. After that amount of time elapsed, the 3DHGS was placed into a solution of phytic acid and ammonium persulfate (enough to fully cover the scaffold), and the solution was kept at 4° C. overnight. The next day, the blue scaffold was removed from the solution and carefully rinsed with DI water until all excess external conducting polymer was removed.

Figure 4:
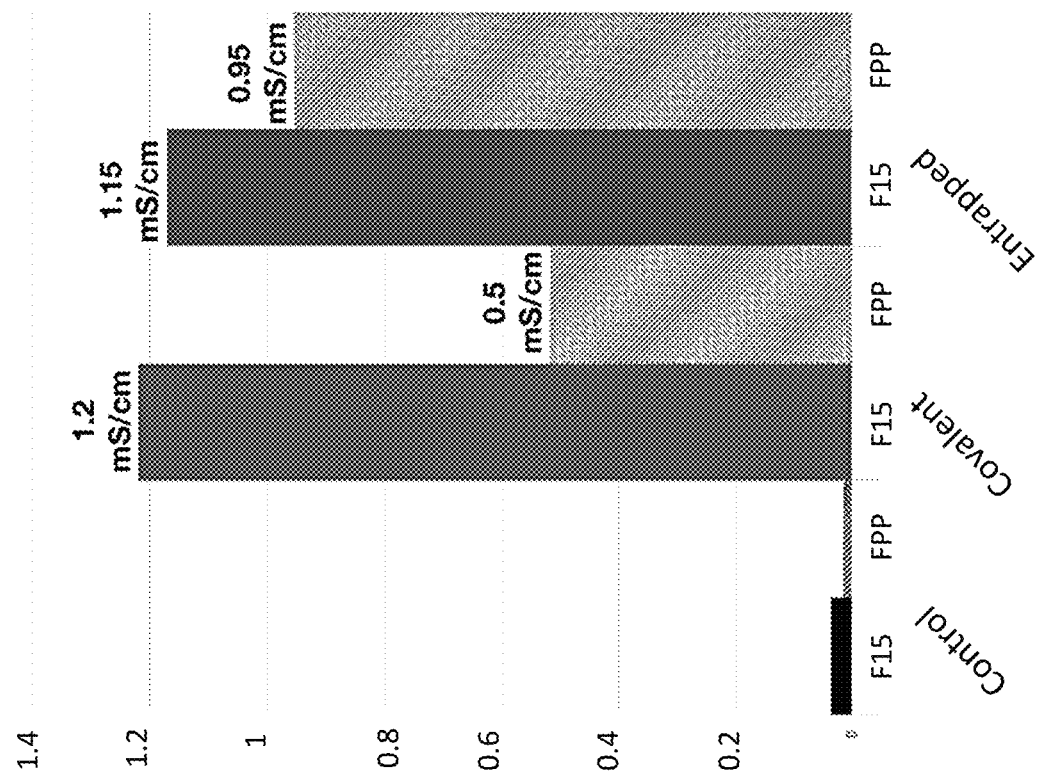
FIG. 4 is a graph of the calculated conductivity for the scaffolds of the Example, in which a poly(ethylenedioxythiophene) is covalently bonded to or entrapped within a hydrogel. The results based on Electrochemical Impedance Spectroscopy (EIS) and a 4-point probe are presented.

Scaffold Characterization:

The conductivities of the hydrogel scaffold having the PEDOT-S covalently bonded thereto ("covalent"), the hydrogel scaffold having the PEDOT-S entrapped therein, but not covalently bonded thereto ("entrapped"), and a control pHEMA scaffold without the PEDOT ("control") were measured. The results are shown in FIG. 4. The conductivity data of FIG. 4 were obtained using standard EIS (F15) and Four-Point Probe (FPP) techniques. Resistance can be measured directly through most digital multimeters (DMMs). The technique is to apply a small sinusoidal current, measure the voltage, and determine resistance through Ohm's Law. The current application and voltage measurement can be done with two probes on a DMM, but using this technique on a soft material gives high resistance values, the sum of resistance through the material and resistance at the electrode/material interface. To determine the approximate resistivity of the composites, a four point probe measurement was taken. Four point probe measurements account for the contactresistance, the obstruction of current at the electrode and material interface, by separating which electrodes apply the current and which electrodes measure.

EIS is a technique in which voltage is oscillated at a range of frequencies and current ismeasured. It is a nondestructive technique to gain insight on the electrochemical and electrostatic properties of a material/electrolyte between two electrodes. Typically, EIS uses three electrodes (a working, counter, and reference electrode), and is of importance when probing the charging or electrochemical reactions at a working electrode. In this example, EIS was used to probe the impedance spectra and thus equivalent circuit between 2 electrodes with the hydrated conducting hydrogel in between the electrodes. EIS was used to characterize the complex impedance of the composite material while the material was wet. The data can be fit to equivalent circuit models that will separate electrochemical events that occur within the solution, here DI water, from transport/charging within the polymer and capacitive double layer formation that occurs at the polymer-electrode interface.

Figure 5A:
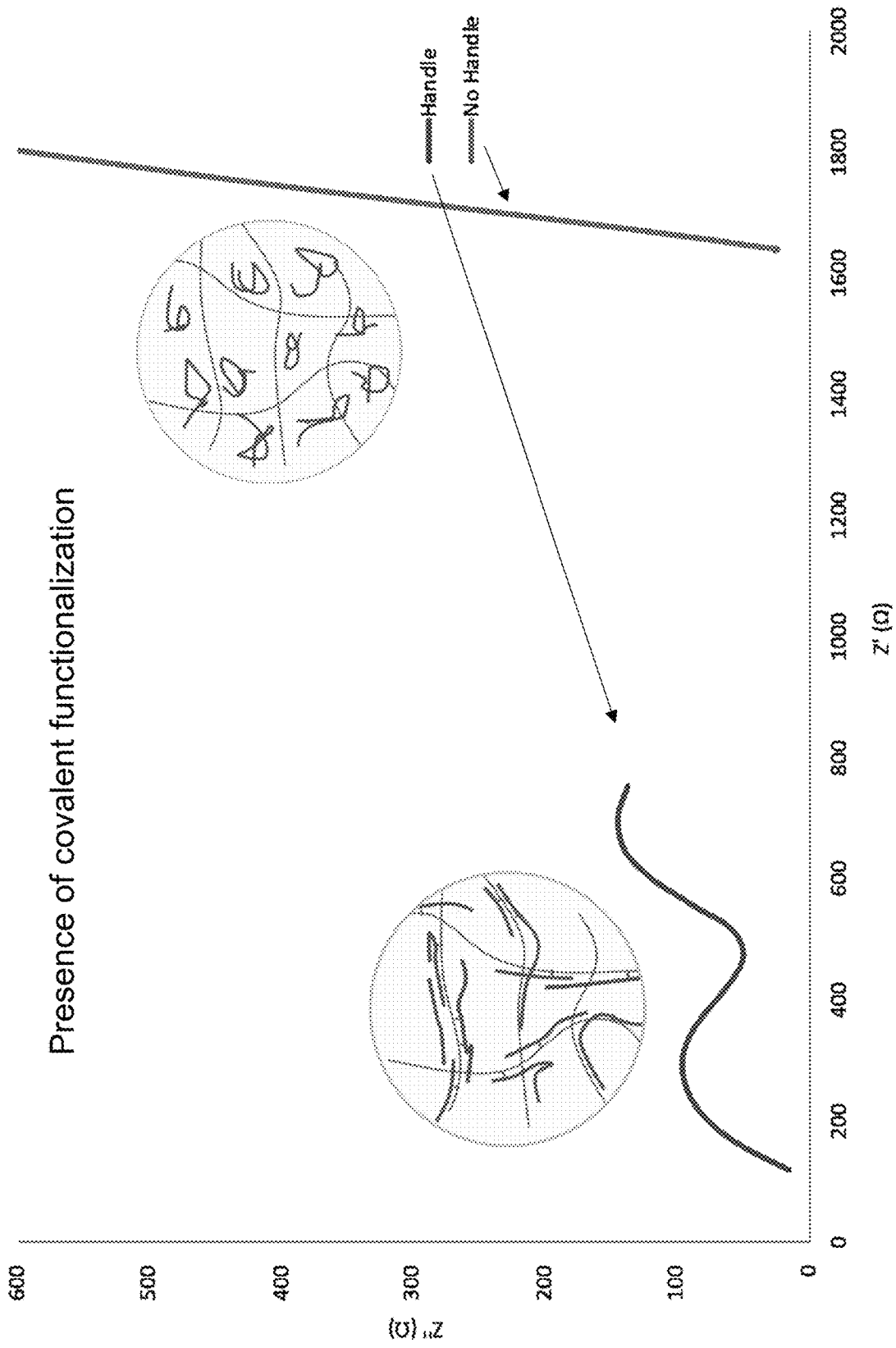
FIG. 5A is a graph of the impedance of the scaffolds of the Example, showing that covalent attachment of the poly (ethylenedioxythiophene) can reduce impedance.

FIG. 5A is a graph of the impedance of the scaffolds, showing that covalent attachment of the poly(ethylenedioxythiophene) can reduce impedance. FIG. 5B is a graph of the impedance of scaffolds with covalently bound poly(ethylenedioxythiophene) as a function of the precursor infusion period, showing that a longer infusion time for the polymer precursors can lower impedance.

To determine Young's modulus, a variety of mechanical tests can be performed, like tensile tests and compression tests. Nanoindentation is a technique that has been growing in popularity in the biomedical field due to the wealth of mechanical information that it returns. In a typical experiment, a micron-scale tip probes into a surface at a controlled depth. Load, depth, and time are all monitored. The data, usually in the form of a load-displacement curve, can be fit to preexisting constitutive models like the Hertzian model or the Ogden model, and these models return information on the Young's modulus, viscosity, and creep of the material. In addition to its ability to return both dynamic and static information in one test, nanoindentation allows for the sample to be completely submerged in a solution.

Figure 6A:
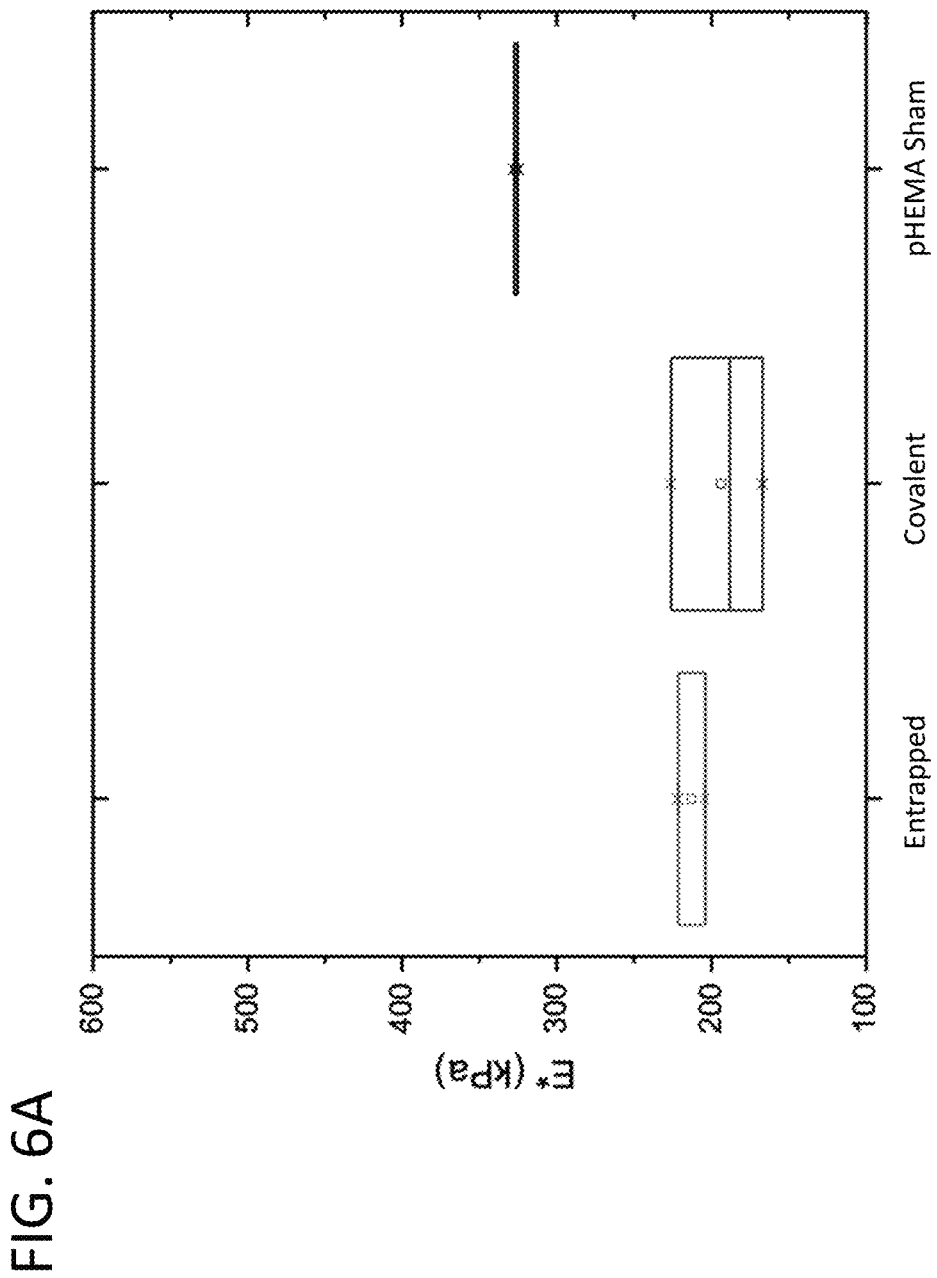
FIG. 6A is a graph showing the Young's modulus for the scaffolds of the Example with entrapped poly(ethylenedioxythiophene), covalently grafted poly(ethylenedioxythiophene), and a pHEMA true sham sample as a comparison.

FIG. 6A is a graph showing the Young's modulus for the pHEMA hydrogel scaffolds with entrapped poly(ethylenedioxythiophene), covalently grafted poly(ethylenedioxythiophene), and a pHEMA true sham sample as a comparison. An infusion time of 24 hours was used. The measurements were obtained using a nanoindenter on samples in their hydrated states. As shown by these data, the polymer-infused scaffolds are softer by about 100 kPa.

Figure 6B:
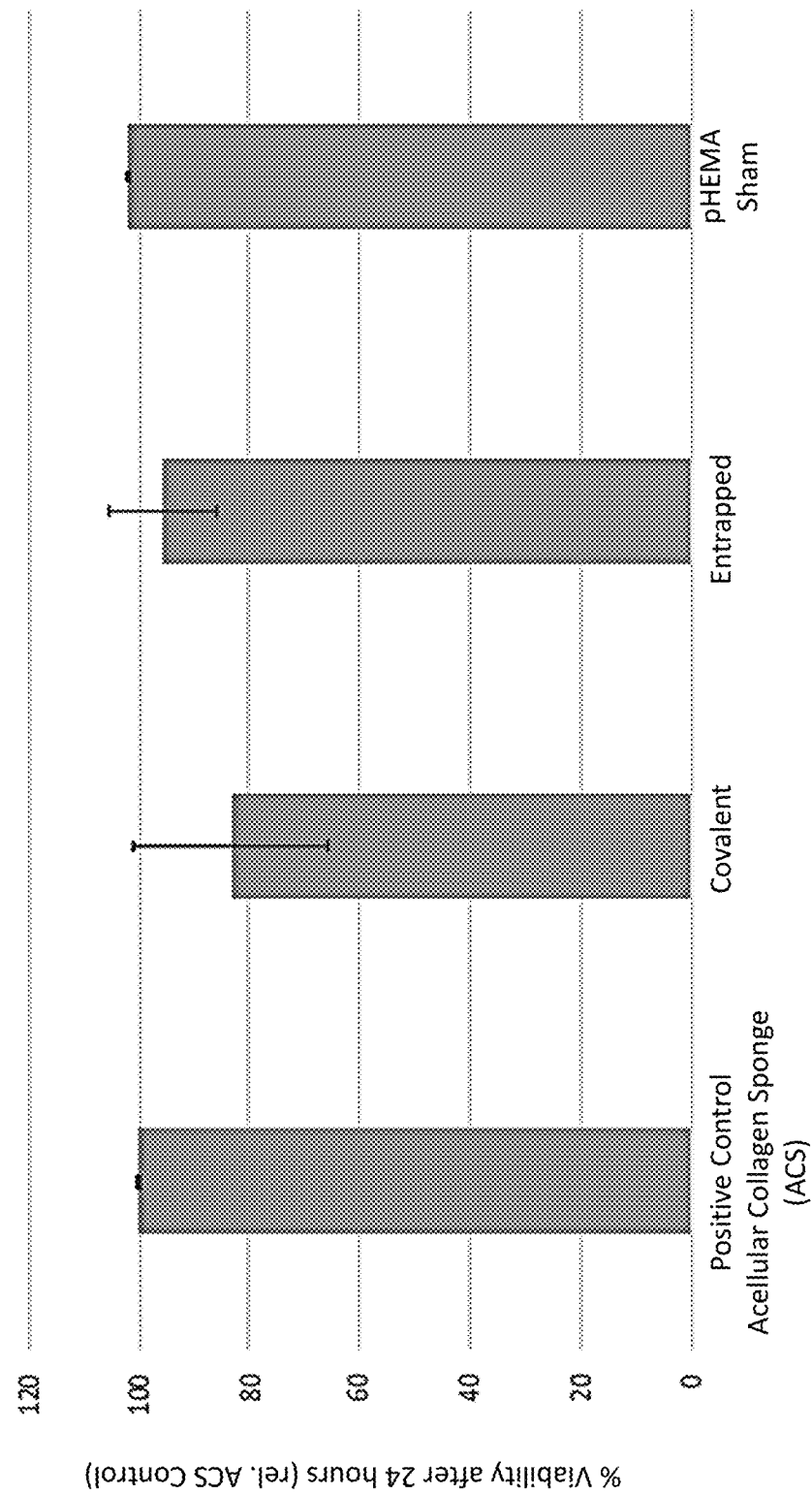
FIG. 6B is a graph showing the viability of L929 fibroblasts cultured for 24 hours on a control clinical grade acellular collagen sponge (ACS), a pHEMA-based hydrogel scaffold with covalently grafted poly(ethylenedioxythiophene), a pHEMA-based hydrogel scaffold with entrapped poly(ethylenedioxythiophene), and a pHEMA sham.

The ability of the hydrogel scaffolds to serve as cell culture scaffolds was demonstrated by culturing L929 fibroblasts on the scaffolds. FIG. 6B is a graph showing the viability of L929 fibroblasts cultured for 24 hours on a control clinical grade acellular collagen sponge (ACS), a pHEMA-based hydrogel scaffold with covalently grafted poly(ethylenedioxythiophene), a pHEMA-based hydrogel scaffold with entrapped poly(ethylenedioxythiophene), and a pHEMA sham. The scaffolds were first coated with fibronectin to promote cell adhesion.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" can mean "only one" or can mean "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A polymer hydrogel composite structure comprising:
   a porous, three-dimensional scaffold comprising a poly(hydroxyethyl(meth)acrylate) hydrogel and having one or more features with a dimension of 100 μm or smaller; and
   a water-soluble, electrically conducting, biocompatible poly(ethylenedioxythiophene) polymer infiltrating the porous, three-dimensional scaffold, wherein the water-soluble, electrically conducting, biocompatible poly(ethylenedioxythiophene) polymer is covalently grafted to the hydrogel by an organic linker having a structure: —$CH_2$—NH—C(O)—$CH_2$—$CH_2$—$CH_2$—C(O)—, wherein the terminal —$CH_2$ group of the organic linker is bonded to a carbon atom of an ethylenediooxy group of the poly(ethylenedioxythiophene) polymer, wherein the carbon atom is not part of a thiophene ring, and the terminal C(O)— group is bonded to the hydrogel.

2. The polymer hydrogel composite structure of claim 1, wherein the one or more features comprise one or more intersecting hydrogel fibers, the one or more hydrogel fibers having fiber diameters of 100 µm or smaller.

3. The polymer hydrogel composite structure of claim 1, wherein the poly(ethylenedioxythiophene) is functionalized with free sulfonate groups.

4. A method of growing biological tissue, the method comprising:
providing a polymer hydrogel composite structure comprising:
a porous, three-dimensional scaffold comprising a poly (hydroxyethyl(meth)acrylate) hydrogel and having one or more features with a dimension of 100 µm or smaller; and
a water-soluble, electrically conducting, biocompatible poly(ethylenedioxythiophene) polymer infiltrating the porous, three-dimensional scaffold, wherein the water-soluble, electrically conducting, biocompatible poly (ethylenedioxythiophene) polymer is covalently grafted to the hydrogel by an organic linker having a structure: —CH$_2$—NH—C(O)—CH$_2$—CH$_2$—CH$_2$—C(O)—, wherein the terminal —CH$_2$ group of the organic linker that is bonded to a carbon atom of an ethylenediooxy group of the poly(ethylenedioxythiophene) polymer, wherein the carbon atom is not part of a thiophene ring, and the terminal C(O)— group is bonded to the hydrogel;
seeding the polymer hydrogel composite structure with biological cells; and
culturing the seeded polymer hydrogel composite structure in a cell culture medium.

5. The method of claim 4, wherein the one or more features comprise one or more intersecting hydrogel fibers, the one or more hydrogel fibers having fiber diameters of 100 µm or smaller.

6. The method of claim 4, wherein the poly(ethylenedioxythiophene) is functionalized with free sulfonate groups.

* * * * *